United States Patent
Hitakatsu et al.

(10) Patent No.: US 12,441,354 B2
(45) Date of Patent: Oct. 14, 2025

(54) VEHICLE CONTROL DEVICE, VEHICLE CONTROL METHOD, AND STORAGE MEDIUM

(71) Applicant: HONDA MOTOR CO., LTD., Tokyo (JP)

(72) Inventors: Sho Hitakatsu, Wako (JP); Toshikazu Suwa, Tokyo (JP); Masaki Nakajima, Yokohama (JP)

(73) Assignee: HONDA MOTOR CO., LTD., Tokyo (JP)

(*) Notice: Subject to any disclaimer, the term of this patent is extended or adjusted under 35 U.S.C. 154(b) by 201 days.

(21) Appl. No.: 17/560,338

(22) Filed: Dec. 23, 2021

(65) Prior Publication Data

US 2022/0204024 A1 Jun. 30, 2022

(30) Foreign Application Priority Data

Dec. 28, 2020 (JP) .................. 2020-218168

(51) Int. Cl.
*B60W 60/00* (2020.01)
*G01C 21/36* (2006.01)
*G06V 20/56* (2022.01)

(52) U.S. Cl.
CPC ....... *B60W 60/001* (2020.02); *G01C 21/3605* (2013.01); *G06V 20/56* (2022.01);
(Continued)

(58) Field of Classification Search
CPC ............ G01C 21/3605; G01C 21/3407; G01C 21/3658; G06V 20/56; G06V 20/582;
(Continued)

(56) References Cited

U.S. PATENT DOCUMENTS

2016/0200317 A1* 7/2016 Danzl .................. B60W 10/04
701/25
2017/0010613 A1* 1/2017 Fukumoto ........ G08G 1/096844
(Continued)

FOREIGN PATENT DOCUMENTS

| CN | 109377061 | 2/2019 |
| CN | 109466557 | 3/2019 |

(Continued)

OTHER PUBLICATIONS

Machine Translation of JP2017090410A (Year: 2017).*
(Continued)

*Primary Examiner* — Sahar Motazedi
(74) *Attorney, Agent, or Firm* — Amin, Turocy & Watson, LLP

(57) ABSTRACT

A vehicle control device according to an embodiment includes: a recognizer that recognizes a situation around a vehicle; a determiner that determines events that define a traveling state of the vehicle based on the situation recognized by the recognizer, a route to a destination of the vehicle, and a position of the vehicle; and a driving controller that performs automated driving that controls at least one of acceleration/deceleration and steering of the vehicle based on the events determined by the determiner, wherein the driving controller changes the control level of the automated driving according to the number of events within a predetermined range in a traveling direction of the vehicle.

3 Claims, 10 Drawing Sheets

(52) U.S. Cl.
CPC ............... *B60W 2554/4041* (2020.02); *B60W 2554/4049* (2020.02)

(58) Field of Classification Search
CPC ............... G06V 20/584; G06V 20/588; B60W 2554/4049; B60W 60/005; B60W 60/001; B60W 2554/4041
See application file for complete search history.

(56) References Cited

U.S. PATENT DOCUMENTS

| | | | | |
|---|---|---|---|---|
| 2018/0099676 | A1* | 4/2018 | Goto | B60W 10/20 |
| 2018/0348755 | A1* | 12/2018 | Yamaguchi | G05D 1/0061 |
| 2019/0025825 | A1* | 1/2019 | Takahama | B60W 50/14 |
| 2019/0080600 | A1 | 3/2019 | Miura et al. | |
| 2019/0232955 | A1* | 8/2019 | Grimm | G06V 10/803 |
| 2020/0283027 | A1* | 9/2020 | Okuyama | B60W 10/20 |
| 2020/0290619 | A1* | 9/2020 | Mehdi | B60W 40/06 |
| 2021/0216066 | A1* | 7/2021 | Shimotani | B60W 50/14 |
| 2023/0192114 | A1* | 6/2023 | Kunberger | B60W 60/001 701/24 |

FOREIGN PATENT DOCUMENTS

| | | | | |
|---|---|---|---|---|
| DE | 102013222294 | A1 * | 6/2014 | ............ B60K 28/00 |
| DE | 102015205135 | A1 * | 9/2016 | |
| DE | 102017208583 | | 11/2018 | |
| JP | 2010-182207 | | 8/2010 | |
| JP | 2017090410 | A * | 5/2017 | |
| JP | 2017-198505 | | 11/2017 | |
| JP | 2018-075873 | | 5/2018 | |
| JP | 2018-101199 | | 6/2018 | |
| JP | 2018-189594 | | 11/2018 | |
| JP | 2019-137228 | | 8/2019 | |
| JP | 2020-166659 | | 10/2020 | |
| KR | 2018-0068490 | | 6/2018 | |
| WO | 2018/189843 | | 10/2018 | |

OTHER PUBLICATIONS

Machine Translation of DE102013222294A1 (Year: 2014).*
Machine Translation of DE102015205135A1 (Year: 2016).*
Japanese Office Action for Japanese Patent Application No. 2020-218168 mailed Aug. 30, 2022.
Chinese Office Action for Chinese Patent Application No. 2021115701593 mailed Apr. 22, 2025.

* cited by examiner

FIG. 5
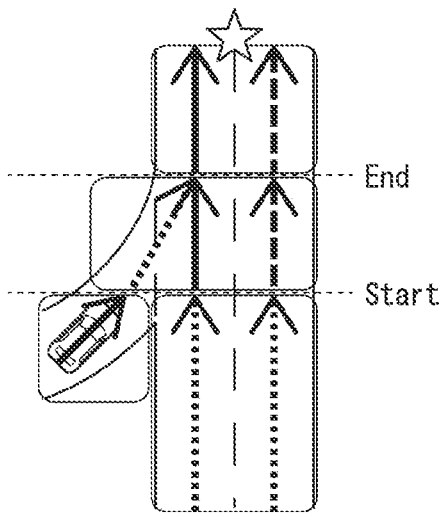
EVENT:MERGING
DIRECTION:RIGHT
STARTING DISTANCE:HOST VEHICLE TO START
ENDING DISTANCE:HOST VEHICLE TO END
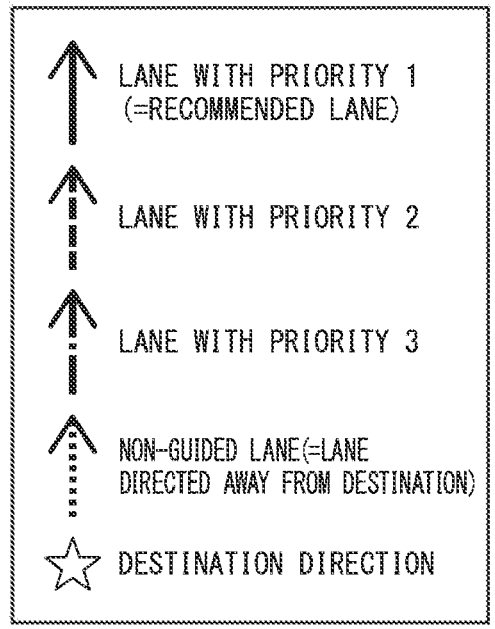
FIG. 6
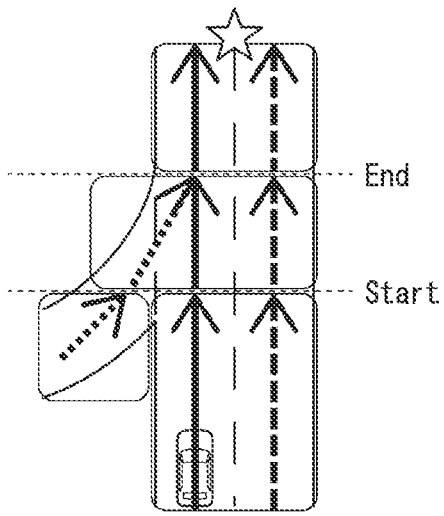
EVENT:MERGING POINT PASSING
DIRECTION:RIGHT
STARTING DISTANCE:HOST VEHICLE TO START
ENDING DISTANCE:HOST VEHICLE TO END
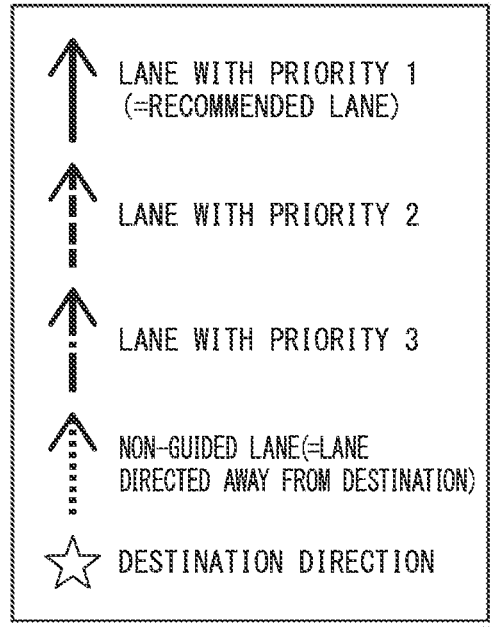

FIG. 9

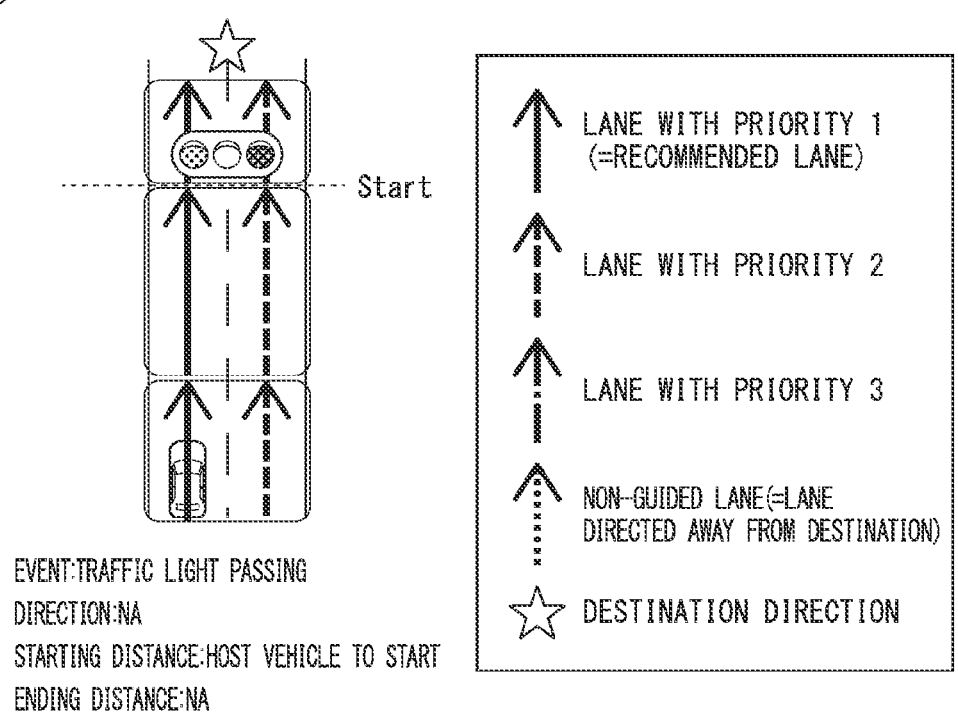

EVENT:TRAFFIC LIGHT PASSING
DIRECTION:NA
STARTING DISTANCE:HOST VEHICLE TO START
ENDING DISTANCE:NA

FIG. 10

| DRIVING MODE | CONTROL STATE | TASK |
|---|---|---|
| MODE A | AUTOMATED DRIVING | FRONT MONITORING: UNNECESSARY STEERING GRIP:UNNECESSARY |
| MODE B | DRIVING SUPPORT | FRONT MONITORING: NECESSARY STEERING GRIP:UNNECESSARY |
| MODE C | DRIVING SUPPORT | FRONT MONITORING: NECESSARY STEERING GRIP:NECESSARY |
| MODE D | DRIVING SUPPORT | FRONT MONITORING:NECESSARY AT LEAST CERTAIN DEGREE OF DRIVING OPERATION IS NECESSARY |
| MODE E | MANUAL DRIVING | FRONT MONITORING:NECESSARY DRIVING OPERATION AS WELL AS STEERING AND ACCELERATION/ DECELERATION IS NECESSARY |

↑ TASK:MILD
↓ TASK:HEAVY

VEHICLE CONTROL DEVICE, VEHICLE CONTROL METHOD, AND STORAGE MEDIUM

CROSS-REFERENCE TO RELATED APPLICATION

This application claims priority to and the benefit from Japanese Patent Application No. 2020-218168, filed on Dec. 28, 2020, the contents of which are hereby incorporated by reference into the present application.

BACKGROUND

Field of the Invention

The present invention relates to a vehicle control device, a vehicle control method, and a storage medium.

Description of Related Art

Conventionally, a technology of repeatedly determining the presence or absence of a road on a high-accuracy map on which a host vehicle may travel and notifying the result of determining the presence or absence of the road on the high-accuracy map is known (for example, see Japanese Patent Application Publication No. 2018-189594).

SUMMARY

In the conventional technology, the possibility of automated driving being able to be performed is automatically notified of based on the information stored in the map. However, in the conventional technology, the processing load becomes high at a point where the amount of information on the map becomes large, and there may be cases where appropriate automated driving is not able to be performed.

The present invention has been made in view of such circumstances, and one of the objects thereof is to provide a vehicle control device, a vehicle control method, and a storage medium capable of performing more appropriate automated driving.

A vehicle control device, a vehicle control method, and a storage medium according to the present invention employ the following configurations.

(1) A vehicle control device including: a recognizer that recognizes a situation around a vehicle; a determiner that determines events that define a traveling state of the vehicle based on the situation recognized by the recognizer, a route to a destination of the vehicle, and a position of the vehicle; and a driving controller that performs automated driving that controls at least one of acceleration/deceleration and steering of the vehicle based on the events determined by the determiner, wherein the driving controller changes the control level of the automated driving according to the number of events within a predetermined range in a traveling direction of the vehicle.

(2) The vehicle control device according to (1), wherein when the number of events exceeds an upper limit number, the driving controller lowers the control level of the automated driving as compared with a case where the number of events is equal to or less than the upper limit number.

(3) The vehicle control device according to (2), wherein the events include first events that are indispensable for the vehicle to reach the destination and second events that are not indispensable for the vehicle to reach the destination, and when the number of remaining first events excluding the second events exceeds the upper limit number, the driving controller lowers the control level of the automated driving.

(4) A vehicle control method for causing a computer mounted on a vehicle to execute: recognizing a situation around a vehicle; determining events that define a traveling state of the vehicle based on the recognized situation, a route to a destination of the vehicle, and a position of the vehicle; and performing automated driving that controls at least one of acceleration/deceleration and steering of the vehicle based on the determined events, wherein changing the control level of the automated driving according to the number of events within a predetermined range in a traveling direction of the vehicle.

(5) A computer-readable non-transitory storage medium storing a program for causing a computer mounted on a vehicle to execute: recognizing a situation around a vehicle; determining events that define a traveling state of the vehicle based on the recognized situation, a route to a destination of the vehicle, and a position of the vehicle; and performing automated driving that controls at least one of acceleration/deceleration and steering of the vehicle based on the determined events, wherein changing the control level of the automated driving according to the number of events within a predetermined range in a traveling direction of the vehicle.

According to the above-described aspects, more appropriate automated driving can be performed.

BRIEF DESCRIPTION OF THE DRAWINGS

FIG. 5 is a diagram schematically illustrating a merging event.

FIG. 6 is a diagram schematically illustrating a merging point passing event.

FIG. 9 is a diagram schematically illustrating a traffic light passing event.

FIG. 10 is a diagram illustrating an example of correspondence between a driving mode, a control state of the host vehicle, and a task.

DESCRIPTION OF EMBODIMENTS

Hereinafter, embodiments of a vehicle control device, a vehicle control method, and a storage medium of the present invention will be described with reference to the drawings.

First Embodiment

[Overall Configuration]

Figure 1:
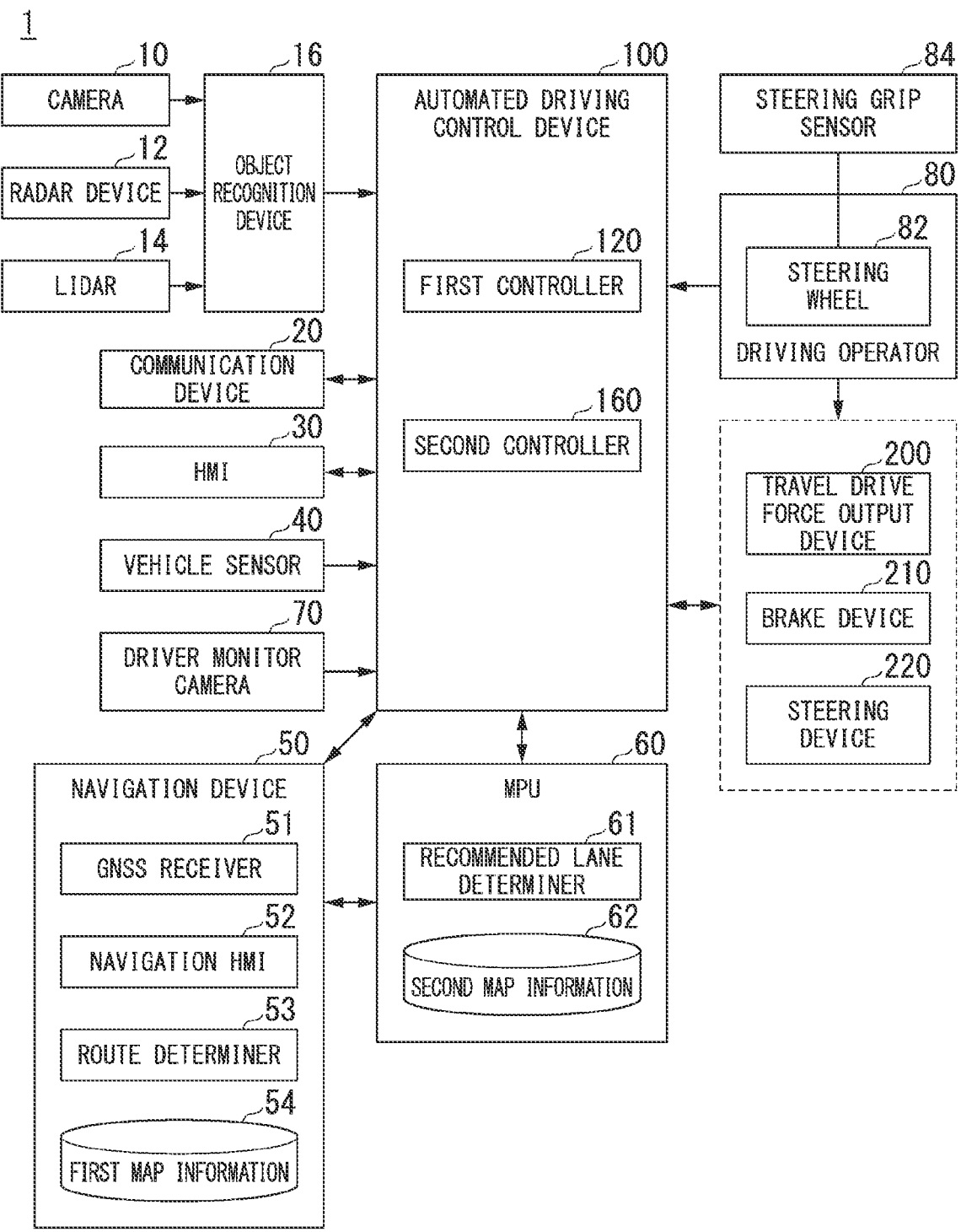
FIG. 1 is a block diagram of a vehicle system using the vehicle control device according to a first embodiment.

FIG. 1 is a block diagram of a vehicle system 1 using a vehicle control device according to the first embodiment. A vehicle in which the vehicle system 1 is mounted is, for example, a vehicle such as a two-wheeled vehicle, a three-wheeled vehicle, or a four-wheeled vehicle, and a driving source thereof is an internal combustion engine such as a diesel engine or a gasoline engine, an electric motor, or a combination thereof. An electric motor operates using electric power generated by a generator connected to an internal combustion engine or electric power discharged by secondary batteries or fuel-cell batteries.

The vehicle system 1 includes, for example, a camera 10, a radar device 12, a light detection and ranging (LIDAR) 14, an object recognition device 16, a communication device 20, a human machine interface (HMI) 30, a vehicle sensor 40, a navigation device 50, a map positioning unit (MPU) 60, a driver monitor camera 70, a driving operator 80, an automated driving control device 100, a travel drive force output device 200, a brake device 210, and a steering device 220. These apparatuses and devices are connected to each other by a multiplex communication line such as a controller area network (CAN) communication line, a serial communication line, a wireless communication network, and the like. Moreover, the components illustrated in FIG. 1 are examples only, some components may be omitted and other components may be added. The automated driving control device 100 is an example of a "vehicle control device".

The camera 10 is, for example, a digital camera which uses a solid-state imaging device such as a charge coupled device (CCD) or a complementary metal oxide semiconductor (CMOS). The camera 10 is attached to an arbitrary position of a vehicle (hereinafter referred to as a host vehicle M) in which the vehicle system 1 is mounted. When capturing images on the front side, the camera 10 is attached to an upper part of a front windshield or a back surface of a rear-view mirror. The camera 10, for example, captures the images around the host vehicle M repeatedly and periodically. The camera 10 may be a stereo camera.

The radar device 12 emits radio waves such as millimeter waves to the surroundings of the host vehicle M and detects radio waves (reflected waves) reflected from an object to detect at least the position (the distance and direction) of the object. One or a plurality of radar devices 12 are attached to arbitrary positions of the host vehicle M. The radar device 12 may detect the position and the speed of an object according to a frequency modulated continuous wave (FM-CW) method.

The LIDAR 14 irradiates the periphery of the host vehicle M with light (or an electromagnetic wave having a wavelength close to that of light) and measures the scattered light. The LIDAR 14 detects the distance to an object on the basis of the time taken to receive light after the light was emitted. The radiated light is pulsating laser light, for example. The LIDAR 14 is attached to an arbitrary position on the host vehicle M.

The object recognition device 16 performs sensor fusion processing on detection results obtained by some or all of the camera 10, the radar device 12, and the LIDAR 14 to recognize the position, the kind, the speed, and the like of an object. The object recognition device 16 outputs the recognition results to the automated driving control device 100. The object recognition device 16 may output the detection results obtained by the camera 10, the radar device 12, and the LIDAR 14 to the automated driving control device 100 as they are. The object recognition device 16 may be omitted from the vehicle system 1.

The communication device 20, for example, communicates with other vehicles present around the host vehicle M, or communicates with various server apparatuses via a wireless base station using a cellular network, a Wi-Fi network, Bluetooth (registered trademark), a dedicated short-range communication (DSRC), or the like.

The HMI 30 presents various pieces information to the occupant of the host vehicle M and accepts input operations by the occupant. The HMI 30 includes various display devices, speakers, buzzers, touch panels, switches, keys, and the like.

The vehicle sensor 40 includes a vehicle speed sensor that determines the speed of the host vehicle M, an acceleration sensor that detects the acceleration, a gyro sensor that determines the velocity, an azimuth sensor that determines the direction of the host vehicle M, and the like. The gyro sensor may include, for example, a yaw rate sensor that determines the angular velocity around the vertical axis.

The navigation device 50 includes, for example, a global navigation satellite system (GNSS) receiver 51, a navigation HMI 52, and a route determiner 53. The navigation device 50 holds the first map information 54 in a storage device such as a hard disk drive (HDD) or a flash memory. The GNSS receiver 51 receives radio waves from a plurality of GNSS satellites (artificial satellites), and specifies the position of the host vehicle M based on the signals of the received radio waves. The GNSS receiver 51 outputs the specified position of the host vehicle M to the route determiner 53, directly to the automated driving control device 100, or indirectly via the MPU 60. The position of the host vehicle M may be specified or complemented by an inertial navigation system (INS) using the output of the vehicle sensor 40.

The navigation HMI 52 includes a display, a speaker, a touch panel, keys, and the like. The navigation HMI 52 may be partially or entirely shared with the HMI 30.

For example, the route determiner 53 determines a route (hereinafter a map route) from the position (or an input arbitrary position) of the host vehicle M specified by the GNSS receiver 51 to a destination input by an occupant using the navigation HMI 52 by referring to the first map information 54.

The first map information 54 may include the curvature of a road, point of interest (POI) information, and the like. The first map information 54 may be stored in a storage of the automated driving control device 100, for example. The map route is output to the MPU 60.

The navigation device 50 may perform route guidance using the navigation HMI 52 on the basis of the map route. The navigation device 50 may be realized by the functions of a terminal device such as a smartphone or a tablet terminal held by an occupant. The navigation device 50 may transmit a present position and a destination to a navigation server via the communication device 20 and acquire a route equivalent to a map route from the navigation server.

The MPU 60 includes a recommended lane determiner 61, for example, and stores second map information 62 in a storage device such as a HDD or a flash memory. The recommended lane determiner 61 is realized when a hardware processor such as a central processing unit (CPU) or the like executes a program (software). The recommended lane determiner 61 may be realized by hardware (a circuit portion; including circuitry) such as large-scale integration (LSI), an application specific integrated circuit (ASIC), a field-programmable gate array (FPGA), or a graphics processing unit (GPU) and may be realized by the cooperation of software and hardware. The program may be stored in advance in a storage device (a storage device including a non-transitory storage medium) of the MPU 60 and may be stored in a removable storage medium such as a DVD or a CD-ROM and be installed in a storage device of the MPU 60 when a storage medium (a non-transitory storage medium) is attached to a drive device.

The recommended lane determiner 61 divides the map route provided from the navigation device 50 into a plurality of blocks (for example, the route may be partitioned every 100 [m] in relation to a vehicle traveling direction) and determines a recommended lane for each block by referring to the second map information 62. The recommended lane determiner 61 determines that the vehicle is traveling in a certain lane from the left. When a branching point is present on a map route, the recommended lane determiner 61 determines a recommended lane so that the host vehicle M can travel along a reasonable route for proceeding to a branch destination.

The second map information 62 is more accurate map information than the first map information 54. The second map information 62 includes, for example, information on lane marks such as information on the center of the lane or the boundary of the lane, information on road shoulders and the roadsides, and the like. The second map information 62 may include road information, traffic regulation information, address information (address and postal codes), facility information, telephone number information, information on the installation position of traffic signs and traffic lights, and the like. The second map information 62 may be updated as necessary by the communication device 20 communicating with other devices.

The driver monitor camera 70 is, for example, a digital camera that uses a solid-state image sensor such as a CCD or CMOS. The driver monitor camera 70 is attached to, for example, an arbitrary portion of the host vehicle M in a position and direction in which the head of an occupant (hereinafter referred to as a driver) seated in the driver's seat of the host vehicle M can be imaged from the front (in the direction in which the face is imaged). For example, the driver monitor camera 70 is attached to the upper part of the display provided in the central portion of the instrument panel of the host vehicle M.

The driving operator 80 includes, for example, an acceleration pedal, a brake pedal, a shift lever, and other operators in addition to the steering wheel 82. Sensors that determine an amount of operation or the presence of an operation are attached to the driving operator 80, and the detection results are output to a part or all of the automated driving control device 100 or the travel drive force output device 200, the brake device 210, and the steering device 220. The steering wheel 82 is an example of an "operator that accepts a steering operation by the driver". The operator does not necessarily have to be circular, and may be in the form of a deformed steering wheel, a joystick, a button, or the like. A steering grip sensor 84 is attached to the steering wheel 82. The steering grip sensor 84 is realized by a capacitance sensor or the like, and outputs a signal capable of detecting whether the driver is gripping the steering wheel 82 (meaning that the steering wheel 82 is in contact with force applied thereto) to the automated driving control device 100.

The automated driving control device 100 includes, for example, a first controller 120 and a second controller 160. The first controller 120 and the second controller 160 each are realized when a hardware processor such as a central processing unit (CPU) or the like executes a program (software). Some or all of these components may be realized by hardware (a circuit portion; including circuitry) such as LSI, ASIC, FPGA, or GPU and may be realized by the cooperation of software and hardware. The program may be stored in advance in a storage device (a storage device including a non-transitory storage medium) such as an HDD or a flash memory of the automated driving control device 100 and may be stored in a removable storage medium such as a DVD or a CD-ROM and be installed in an HDD or a flash memory of the automated driving control device 100 when a storage medium (a non-transitory storage medium) is attached to a drive device.

Figure 2:
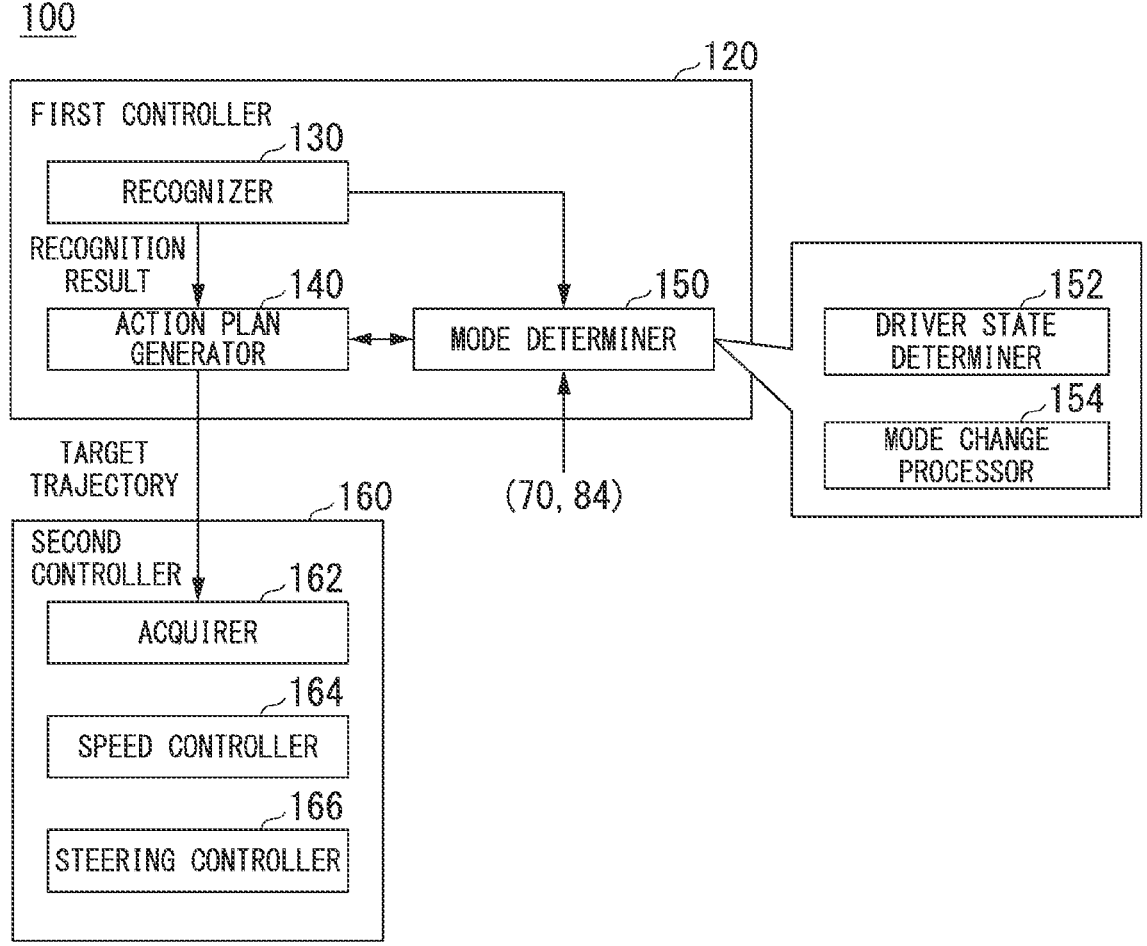
FIG. 2 is a diagram illustrating a functional configuration of a first controller and a second controller.

FIG. 2 is a diagram illustrating a functional configuration of the first controller 120 and the second controller 160. The first controller 120 includes, for example, a recognizer 130, an action plan generator 140, and a mode determiner 150. The combination of the action plan generator 140 and the second controller 160, or the combination of the action plan generator 140, the mode determiner 150, and the second controller 160 is an example of the "driving controller".

For example, the first controller 120 realizes the functions of artificial intelligence (AI) and the functions of a predetermined model in parallel. For example, a function of "recognizing an intersection" may be realized by executing recognition of an intersection by deep learning and the like and recognition based on a predetermined condition (signals, lane marks, and the like which can be subjected to pattern matching) in parallel and scoring both recognition results to make comprehensive evaluation. In this way, the reliability of automated driving is secured.

The recognizer 130 recognizes the situation or environment around the host vehicle M. For example, the recognizer 130 recognizes an object present in the vicinity of the host vehicle M based on the information input from the camera 10, the radar device 12, and the LIDAR 14 via the object recognition device 16. Objects recognized by the recognizer 130 include, for example, bicycles, motorcycles, four-wheeled vehicles, pedestrians, road signs, road markings, lane markings, utility poles, guardrails, falling objects, and the like. Further, the recognizer 130 recognizes the position of the object, the speed, the acceleration, and the like. The object position is recognized as the position on an absolute coordinate system in which a representative point (the center, the center of gravity, the center of a driving shaft, or the like) of the host vehicle M is at the origin, for example, and is used for control. The object position may be represented by a representative point such as the center of gravity or a corner of the object and may be represented by a region. The "state" of an object may include the acceleration or a jerk of an object or an "action state" (for example, whether the object has changed or is trying to change lanes).

For example, the recognizer 130 recognizes a lane (a host lane) in which the host vehicle M is traveling, an adjacent lane adjacent to the host lane, and the like. For example, the recognizer 130 recognizes the space between lane marks as a host lane or an adjacent lane by acquiring the second map information 62 from the MPU 60 and comparing a pattern (for example, an arrangement of solid lines and broken lines) of lane marks included in the acquired second map information 62 and a pattern of lane marks around the host vehicle M recognized from the images captured by the camera 10.

The recognizer 130 may recognize a lane such as a host lane or an adjacent lane by recognizing runway boundaries (road boundaries) including lane marks, road shoulders, roadsides, curbs, a median strip, guard rails, and the like without being limited to the lane marks. In this recognition, the position of the host vehicle M acquired from the navigation device 50 and the processing results of the INS may be also taken into consideration. The recognizer 130 recognizes a temporary stop line, an obstacle, a red sign, a toll booth, and other road events.

When recognizing the host lane, the recognizer 130 recognizes the relative position and direction of the host vehicle M in relation to the host lane. For example, the recognizer 130 may recognize an offset from a lane center of a reference point of the host vehicle M and an angle between the traveling direction of the host vehicle M and an extension line of the lane center as the relative position and the direction of the host vehicle M in relation to the host lane. Instead of this, the recognizer 130 may recognize the position or the like of the reference point of the host vehicle M in relation to any one of side ends (lane marks or road boundaries) of the host lane as the relative position of the host vehicle M in relation to the host lane.

In principle, the action plan generator 140 generates a future target trajectory along which the host vehicle M travels automatically (regardless of an operation of a driver) in the traveling state defined by the event described later so that the host vehicle M travels in the recommended lane determined by the recommended lane determiner 61 and it is possible to cope with a surrounding situation of the host vehicle M. The target trajectory includes a speed element, for example. For example, the target trajectory is represented as an arrangement of positions (trajectory points) that the host vehicle M has to reach. The trajectory points are positions that the host vehicle M has to reach every predetermined travel distance (for example, approximately every several [m]) as the distance along a road. In addition to this, a target speed and a target acceleration every predetermined sampling period (for example, approximately every 0.x [sec]) are generated as part of the target trajectory. The trajectory points may be the positions that the host vehicle M has to reach at respective sampling time points of the predetermined sampling periods. In this case, the information of the target speed and the target acceleration is represented by the intervals of the trajectory points.

In order to cope with the surrounding situation of the host vehicle M, the action plan generator 140 may exceptionally generate a target trajectory such that the host vehicle M travels in another lane different from the recommended lane (for example, a lane adjacent to the recommended lane). That is, the priority of the other lane other than the recommended lane is relatively lower than the priority of the recommended lane. For example, the recommended lane has the highest priority (priority 1), the other lane adjacent to the recommended lane (hereinafter referred to as the adjacent lane) has the second highest priority (priority 2), and the priority of another lane adjacent to the adjacent lane has the third highest (priority 3). In this way, the action plan generator 140, in principle, generates a target trajectory such that the host vehicle M travels in the recommended lane having the highest priority, and exceptionally generates a target trajectory such that the host vehicle M travels in another lane having a lower priority than the recommended lane depending on the surrounding situation of the host vehicle M.

When generating the target trajectory, the action plan generator 140 determines an event for automated driving (including some driving support) on the route in which the recommended lane is determined. The automated driving event is information that defines the behavior that the host vehicle M should take under automated driving (some driving support), that is, the state during traveling (or the mode during traveling).

The automated driving event includes a constant speed travel event, a low-speed pilot travel event, a lane change event, a passing event, and the like. The constant speed travel event is an event in which the host vehicle M travels in the same lane at a constant speed. The low-speed pilot travel event is an event in which the host vehicle M follows another vehicle (hereinafter referred to as a preceding vehicle) existing within a predetermined distance (for example, within 100 [m]) in front of the host vehicle M and closest to the host vehicle M. The "pilot" may be, for example, a traveling state in which the relative distance (inter-vehicle distance) between the host vehicle M and the preceding vehicle is kept constant, or a traveling state in which the host vehicle M travels in the center of the host lane in addition to the relative distance between the host vehicle M and the preceding vehicle being kept constant. The lane change event is an event that the host vehicle M changes its lane from the host lane to an adjacent lane. The passing event is an event in which the host vehicle M temporarily changes its lane to an adjacent lane, passes a preceding vehicle in the adjacent lane, and changes its lane to the original lane again.

Further, the event of automated driving includes a branching event, a branching point passing event, a merging event, a merging point passing event, a lane reduction event, a takeover event, a traffic light passing event, and the like.

Figure 3:
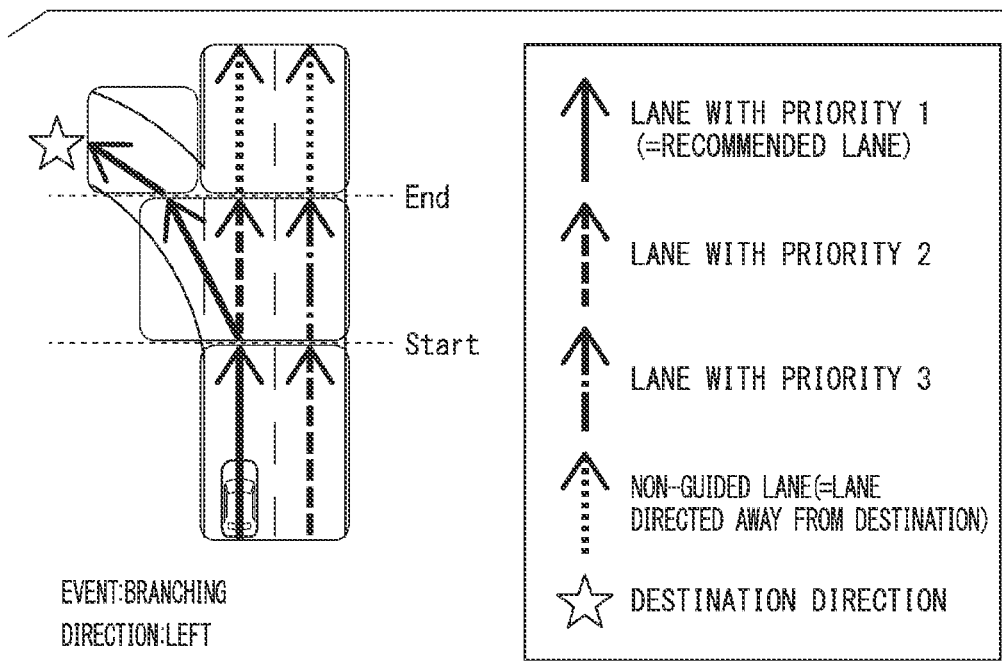
FIG. 3 is a diagram schematically illustrating a branching event.

FIG. 3 is a diagram schematically illustrating a branching event. The branching event is an event in which, when the host vehicle M is traveling in a main line and the destination is on an extension of a branch line (hereinafter referred to as a branch lane) branched from the main line, the host vehicle M is guided to change its lane from the main line to the branch lane at a branching point.

Figure 4:
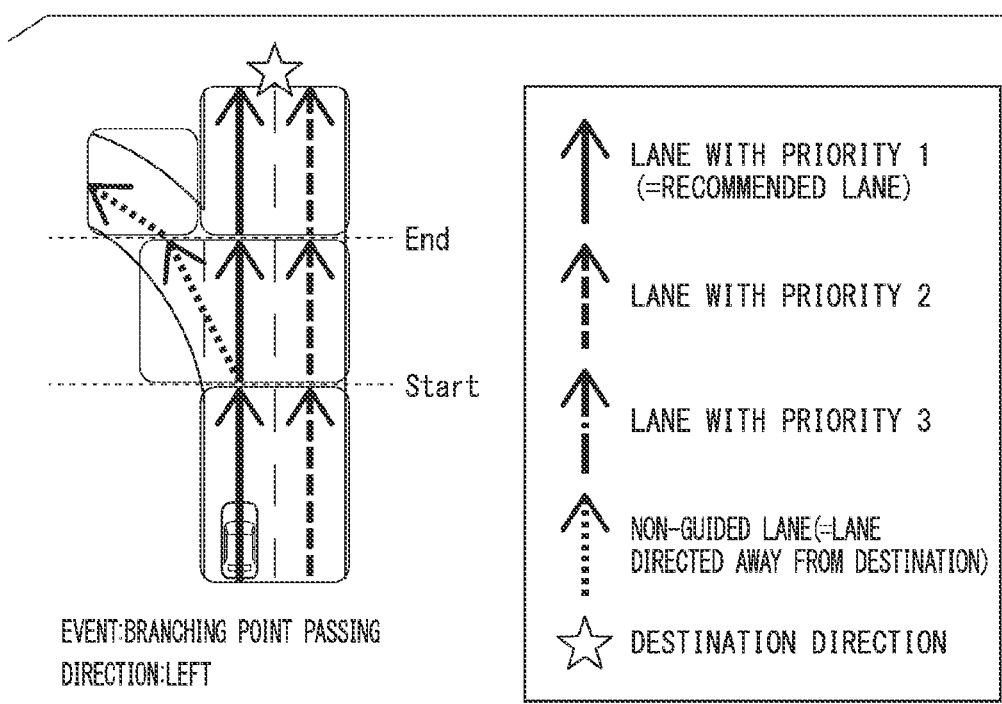
FIG. 4 is a diagram schematically illustrating a branching point passing event.

FIG. 4 is a diagram schematically illustrating a branching point passing event. The branching point passing event is an event in which, when the host vehicle M is traveling in a main line and the destination is on an extension of the main line, the host vehicle M is guided to continue traveling in the main line without branching from the main line at a branching point.

FIG. 5 is a diagram schematically illustrating a merging event. The merging event is an event in which, when the host vehicle M is traveling in a branch line (hereinafter referred to as a merging lane) that merges with the main line and the destination is on an extension of the main line, the host vehicle M is guided to change its lane from the merging lane to the main line at a merging point.

FIG. 6 is a diagram schematically illustrating a merging point passing event. The merging point passing event is an event in which, when the host vehicle M is traveling in the main line and the destination is on the extension line of the main line, the host vehicle M is guided to continue traveling in the main line at a merging point.

Figure 7:
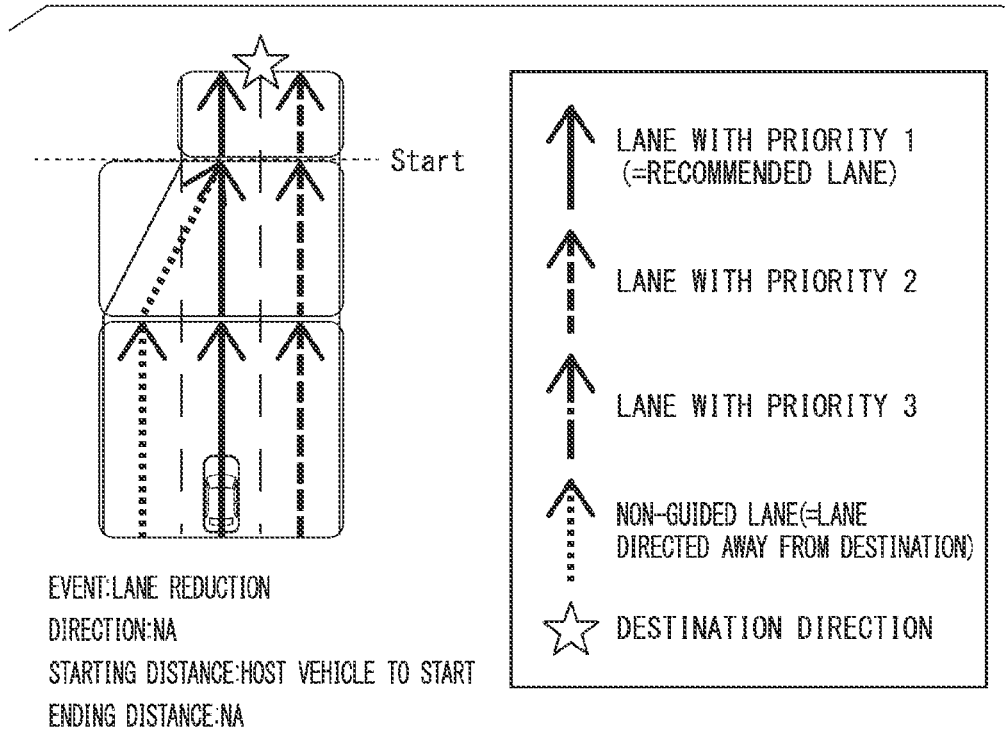
FIG. 7 is a diagram schematically illustrating a lane reduction event.

FIG. 7 is a diagram schematically illustrating a lane reduction event. The lane reduction event is an event in which, when the host vehicle M is traveling on a route in which the number of lanes is reduced on the way, the host vehicle M is guided to change its lane to another lane or continue traveling in the current lane.

Figure 8:
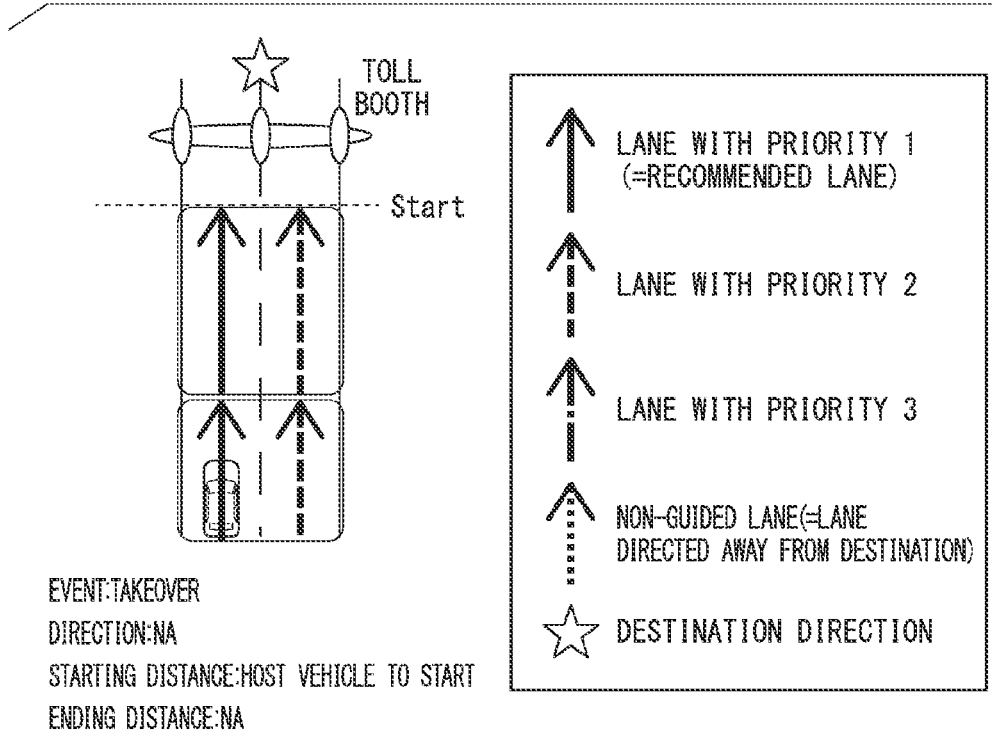
FIG. 8 is a diagram schematically illustrating a takeover event.

FIG. 8 is a diagram schematically illustrating a takeover event. The takeover event is an event for ending the automated driving mode (mode A described later) and switching to a driving support mode (modes B, C, D described later) or a manual driving mode (mode E described later). For example, the lane mark may be interrupted in front of the toll booth on an expressway, and the relative position of the host vehicle M may not be recognized. In such a case, a takeover event is determined (planned) for the section in front of the toll booth.

FIG. 9 is a diagram schematically illustrating a traffic light passing event. The traffic light passing event is an event in which the host vehicle M is stopped or started according to the signal of the traffic light.

The action plan generator 140 sequentially determines the plurality of events on the route to the destination, and generates the target trajectory for the host vehicle M to travel in the state specified by each event while taking the surrounding situation of the host vehicle M into consideration.

Returning to FIG. 2, the mode determiner 150 determines any one of a plurality of driving modes as the driving mode of the host vehicle M. In the plurality of driving modes, the driver is assigned with different tasks. The mode determiner 150 includes, for example, a driver state determiner 152 and a mode change processor 154. These individual functions will be described later.

FIG. 10 is a diagram illustrating an example of the correspondence between the driving mode, the control state of the host vehicle M, and the task. The driving mode of the host vehicle M includes, for example, five modes of mode A to mode E. Among these modes, the degree of automation of the control state, that is, the driving control of the host vehicle M, is highest in mode A, decreasing in the order of mode B, mode C, and mode D, and is lowest in mode E. On the contrary, the task assigned to the driver (occupant) is smallest (mild) in mode A, increasing (becoming heavy) in the order of mode B, mode C, and mode D, and is largest (heavy) in mode E in which manual driving is performed. In modes D and E, the control state is not automated driving. Therefore, the automated driving control device 100 is responsible for operations until ending control related to automated driving and shifting to driving support or manual driving. Hereinafter, the contents of each mode will be illustrated.

In mode A, the vehicle is in an automated driving state, and the driver is not assigned with any of the tasks of front monitoring and gripping the steering wheel 82 (in the drawing, steering grip). However, even in mode A, the driver is required to be in a posture to quickly shift to manual driving in response to a request from the system centered on the automated driving control device 100. The term "automated driving" as used herein means that both the steering and speed of the host vehicle M are controlled without depending on the driver's operation. Mode A is, for example, a mode in which the host vehicle M is caused to travel so that the speed of the host vehicle M becomes the target speed. For example, when a condition that the host vehicle M is traveling at a predetermined speed (for example, about 50 [km/h]) or less on an automobile-only road such as a highway, and a following target preceding vehicle traveling in the same lane as the host vehicle M or a recommended lane is present is satisfied, mode A is a driving mode in which pilot travel of following a preceding vehicle can be executed and may be called a traffic jam pilot mode (TJP mode). When this condition is not satisfied, the mode determiner 150 changes the driving mode of the host vehicle M to mode B.

In mode B, the vehicle is in a driving support state, and the driver is assigned with a task of monitoring the front of the host vehicle M (hereinafter, front monitoring), but is not assigned with gripping the steering wheel 82. In mode C, the vehicle is in a driving support state, and the driver is assigned with a front monitoring task and a task of gripping the steering wheel 82. Mode D is a driving mode in which a certain degree of driving operation by the driver is required for at least one of steering and acceleration/deceleration of the host vehicle M. For example, in mode D, driving support such as adaptive cruise control (ACC) and lane keeping assistance system (LKAS) is performed. In mode E, the vehicle is in a manual driving state in which the driving operation by the driver is required for steering and acceleration/deceleration of the host vehicle M. In both mode D and mode E, the driver is naturally assigned with a task of monitoring the front of the host vehicle M.

The automated driving control device 100 (and a driving support device (not illustrated)) executes an automated lane change according to a driving mode. The automated lane change includes an automated lane change (1) according to a system request and an automated lane change (2) according to a driver request. The automated lane change (1) includes an automated lane change for passing, performed when the speed of a preceding vehicle is smaller than the speed of the host vehicle by a reference or more and an automated lane change for traveling toward a destination (an automated lane change due to change in the recommended lane). The automated lane change (2) changes the lane of the host vehicle M toward the direction operated by the driver operating a direction indicator when the conditions related to the speed and the positional relationship with the surrounding vehicles are satisfied.

In mode A, the automated driving control device 100 does not execute either the automated lane change (1) or (2). In modes B and C, the automated driving control device 100 executes both the automated lane changes (1) and (2). In mode D, the driving support device (not illustrated) does not execute the automated lane change (1) but executes the automated lane change (2). In mode E, neither the automated lane change (1) nor (2) is executed.

The mode determiner 150 changes the driving mode of the host vehicle M to a driving mode in which the task is heavier when the task related to the determined driving mode is not executed by the driver.

For example, in mode A, when the driver is in a posture where he/she cannot shift to manual driving in response to a request from the system (for example, when he/she continues to look outside the permissible area, or when a sign that driving becomes difficult is detected), the mode determiner 150 uses the HMI 30 to urge the driver to shift to manual driving, and performs control such that if the driver does not respond, the host vehicle M is moved to the shoulder of the road and gradually stopped, and automated driving is stopped. After the automated driving is stopped, the host vehicle M is in mode D or E, and the host vehicle M can be started by the manual operation of the driver. Hereinafter, the same applies to "stopping of automated driving". In mode B, when the driver is not monitoring the front, the mode determiner 150 uses the HMI 30 to urge the driver to monitor the front, and performs control such that if the driver does not respond, the host vehicle M is moved to the shoulder of the road and gradually stopped, and automated driving is stopped. In mode C, if the driver is not monitoring the front, or is not gripping the steering wheel 82, the mode determiner 150 uses the HMI 30 to urge the driver to monitor the front and/or grip the steering wheel 82, and performs control such that if the driver does not respond, the host vehicle M is moved to the shoulder of the road and gradually stopped, and automated driving is stopped.

The driver state determiner 152 monitors the driver's state for changing (switching) the mode, and determines whether the driver's state is in a state corresponding to the task. For example, the driver state determiner 152 analyzes the image captured by the driver monitor camera 70 to perform posture estimation processing, and determines whether the driver is in a posture where he/she cannot shift to manual driving in response to a request from the system. The driver state determiner 152 analyzes the image captured by the driver monitor camera 70 to perform line-of-sight estimation processing and determines whether the driver is monitoring the front.

The mode change processor 154 performs various processes for changing the mode. For example, the mode change processor 154 instructs the action plan generator 140 to generate a target trajectory for stopping at a road shoulder, gives an operation instruction to a driving support device (not illustrated), or controls the HMI 30 to urge the driver to perform an action.

The second controller 160 controls the travel drive force output device 200, the brake device 210, and the steering device 220 so that the host vehicle M passes the target trajectory generated by the action plan generator 140 at the scheduled time.

The second controller 160 includes, for example, an acquirer 162, a speed controller 164, and a steering controller 166. The acquirer 162 acquires information on the target trajectory (trajectory points) generated by the action plan generator 140 and stores the information in a memory (not illustrated). The speed controller 164 controls the travel drive force output device 200 or the brake device 210 on the basis of a speed element included in the target trajectory stored in the memory. The steering controller 166 controls the steering device 220 according to the degree of curving of the target trajectory stored in the memory. The processes of the speed controller 164 and the steering controller 166 are realized by a combination of feedforward control and feedback control, for example. As an example, the steering controller 166 executes feedforward control according to the curvature of a road in front of the host vehicle M and feedback control based on an offset from a target trajectory in combination.

The travel drive force output device 200 outputs a travel drive force (torque) for a vehicle to travel to driving wheels. The travel drive force output device 200 includes, for example, a combination of an internal combustion engine, an electric motor, and a transmission and an electronic controller (ECU) that controls these components. The ECU controls the above-mentioned components according to the information input from the second controller 160 or the information input from the driving operator 80.

The brake device 210 includes, for example, a brake caliper, a cylinder that delivers hydraulic pressure to the brake caliper, an electric motor that generates hydraulic pressure in the cylinder, and a brake ECU. The brake ECU controls the electric motor according to the information input from the second controller 160 or the information input from the driving operator 80 so that brake torque corresponding to a braking operation is output to each wheel. The brake device 210 may include a backup mechanism that delivers hydraulic pressure generated by an operation of a brake pedal included in the driving operator 80 to a cylinder via a master cylinder. The brake device 210 is not limited to the above-described configuration and may be an electrically-controlled hydraulic-pressure brake device that controls an actuator according to information input from the second controller 160 and delivers hydraulic pressure of the master cylinder to a cylinder.

The steering device 220 includes, for example, a steering ECU and an electric motor. The electric motor, for example, applies a force to a rack-and-pinion mechanism to change the direction of a steering wheel. The steering ECU drives an electric motor according to the information input from the second controller 160 or the information input from the driving operator 80 to change the direction of the steering wheel.

[Processing Flow]

Figure 11:
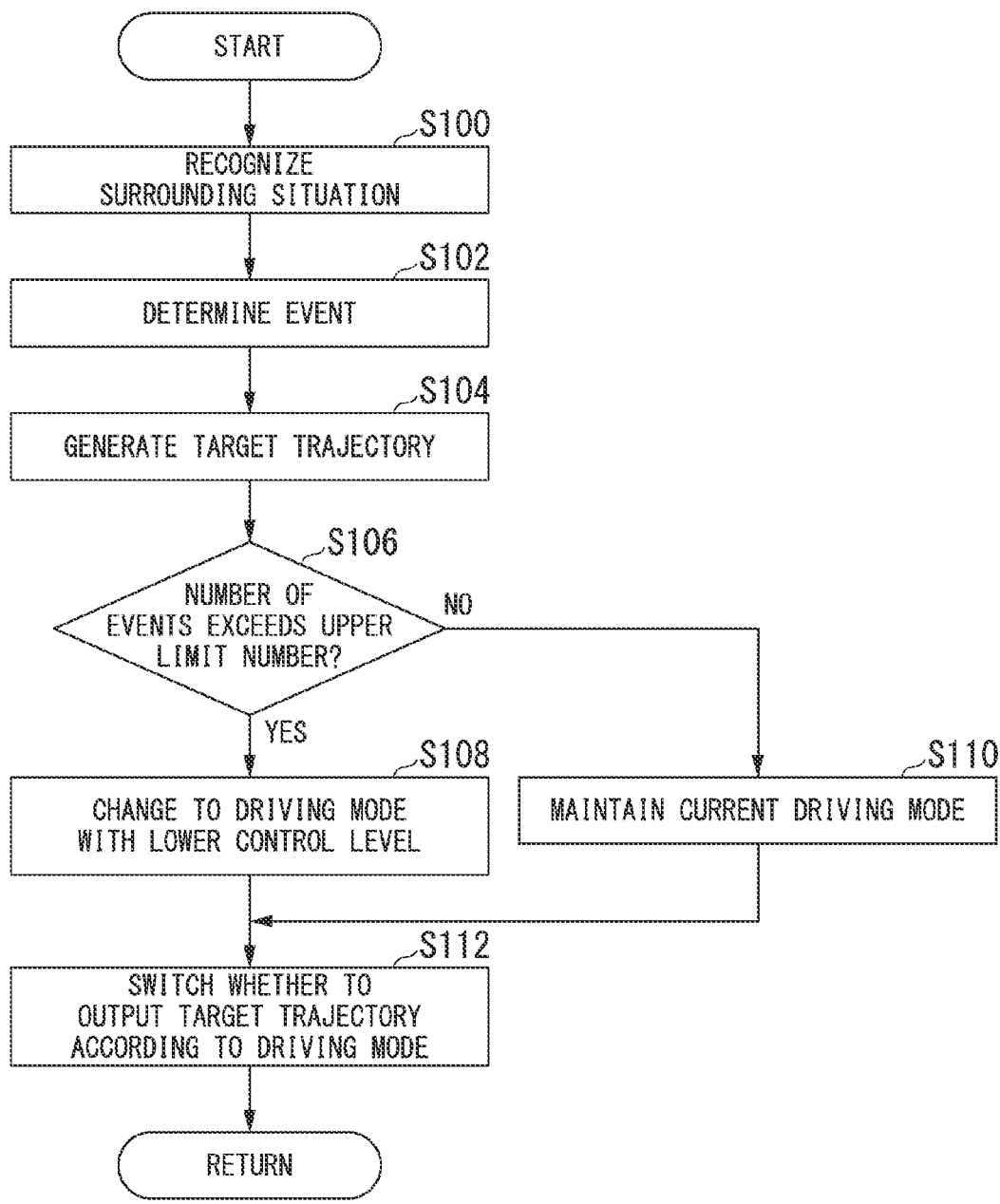
FIG. 11 is a flowchart illustrating an example of the flow of a series of processes by the automated driving control device according to the first embodiment.

Hereinafter, the flow of a series of processes of the automated driving control device 100 according to the first embodiment will be described with reference to a flowchart. FIG. 11 is a flowchart illustrating an example of the flow of a series of processes of the automated driving control device 100 according to the first embodiment. The processing of this flowchart may be repeatedly executed at predetermined intervals, for example, when some of the following execution conditions are satisfied.

Condition (i): The automated driving control device 100 could acquire the second map information 62 from the MPU 60.

Condition (ii): The host vehicle M is not traveling in the prohibited section of mode A or mode B.

Condition (iii): No abnormality has occurred in the second map information 62.

First, the recognizer 130 recognizes the situation (or environment) around the host vehicle M (step S100).

Next, the action plan generator 140 determines an event for automated driving on the route to the destination where the recommended lane is determined by the MPU 60 (step S102). For example, the action plan generator 140 may sequentially determine the events to be executed under the automated driving along the route to the destination (with respect to the extending direction of the route). For example, it may be assumed that a certain section A, a section B adjacent to the section A, and a section C adjacent to the section B are present on the route to the destination. The sections do not have to be evenly spaced and may be unevenly spaced. In such a case, the action plan generator 140 determines one event $I_A$ to be executed in the section A, one event $I_B$ to be executed in the section B, and one event $I_C$ to be executed in the section C. As a result, the events are executed in the order of $I_A$, $I_B$, and $I_C$ as the host vehicle M travels on the route. Further, the action plan generator 140 may dynamically change one event determined in each section to another event of a different type or may dynamically divide an event into a plurality of events in order to flexibly cope with the surrounding situation of the host vehicle M.

Next, the action plan generator 140 generates a target trajectory for each event (step S104).

Next, the mode change processor 154 monitors the number of events (hereinafter referred to as an event count N) determined (planned) for a section within a predetermined distance Dth ahead of the current position of the host vehicle M (in the traveling direction of the host vehicle M) among one or a plurality of events determined by the action plan generator 140 and determines whether the event count N exceeds an upper limit number $N_{MAX}$ (step S106). The upper limit number $N_{MAX}$ may be, for example, about several tens.

Figure 12:
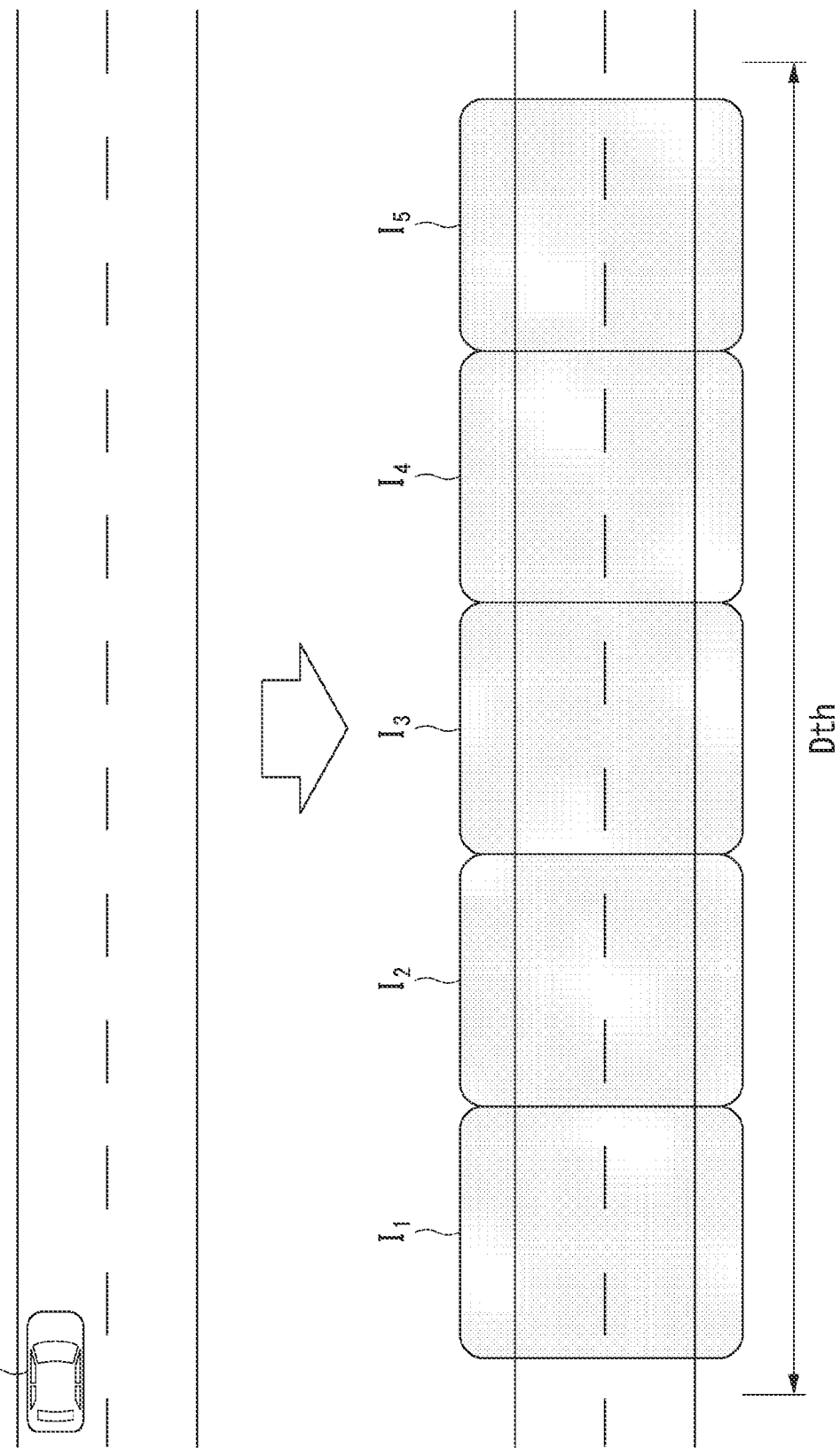
FIG. 12 is a diagram illustrating a situation in which the number of events is equal to or less than the upper limit number.
Figure 13:
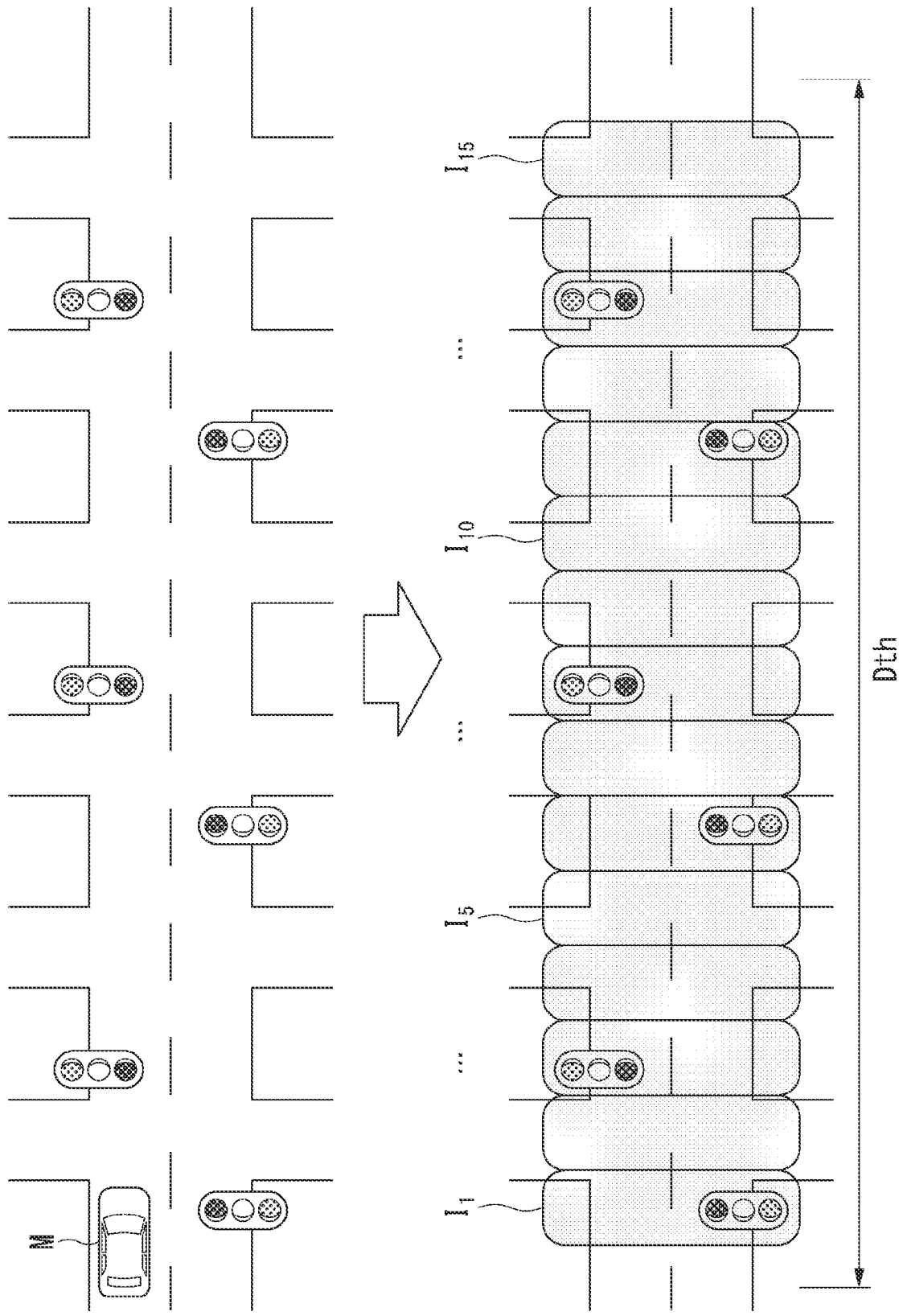
FIG. 13 is a diagram illustrating a situation in which the number of events exceeds the upper limit number.

FIG. 12 is a diagram illustrating a situation in which the event count N is equal to or less than the upper limit number $N_{MAX}$, and FIG. 13 is a diagram illustrating a situation in which the event count N exceeds the upper limit number $N_{MAX}$. As illustrated in FIG. 12, when the host vehicle M travels on a route with a simple road structure and traffic conditions, the event count N tends to be small (five events $I_1$ to $I_5$ in the drawing), and as a result, tends to be equal to or less than the upper limit number is $N_{MAX}$. Such a route with a simple road structure and traffic conditions is, for example, an automobile-only road such as an expressway. On the other hand, as illustrated in FIG. 13, when the host vehicle M travels on a route with a complex road structure and traffic conditions, the event count N tends to be large (15 events $I_1$ to $I_{15}$ in the drawing), and as a result, tends to exceed the upper limit number $N_{MAX}$. Such a route with a complex road structure and traffic conditions is, for example, an urban road with many intersections and narrow roads.

Returning to the description of the flowchart of FIG. 11, when the event count N exceeds the upper limit number $N_{MAX}$, the mode change processor 154 changes the driving mode of the host vehicle M to a driving mode having a lower control level (step S108).

For example, when the driving mode of the host vehicle M is mode A or mode B, the mode change processor 154 changes the driving mode to mode C or mode D having a lower control level than mode B. In other words, the mode change processor 154 changes the driving mode to mode C or mode D in which heavier duties (more tasks) are assigned to the occupant than in mode B.

As described above, mode A and mode B are modes in which gripping of the steering wheel 82 is not assigned to the occupant as a duty. In contrast, mode C or mode D is a mode in which gripping of the steering wheel 82 is assigned to the occupant as a duty. Therefore, when the event count N exceeds the upper limit number $N_{MAX}$ during automated driving or driving support, the mode change processor 154 changes the driving mode of the host vehicle M to a mode in which gripping of the steering wheel 82 is assigned to the occupant as a duty.

Further, in mode E, which is a manual driving mode, gripping of the steering wheel 82 is assigned to the occupant as a duty. Therefore, when the event count N exceeds the upper limit number $N_{MAX}$ during automated driving or driving support, the mode change processor 154 may change any of the automated driving or driving support modes to mode E.

On the other hand, when the event count N is equal to or less than the upper limit number $N_{MAX}$, the mode change processor 154 maintains the current driving mode without changing the driving mode of the host vehicle M (step S110).

The action plan generator 140 switches between whether or not to output the target trajectory to the second controller 160 according to the driving mode which has been changed to or is being maintained by the mode change processor 154 (step S112). For example, when the current driving mode is mode A, B, or C and the event count N is equal to or less than the upper limit number NMAX, the current driving mode is maintained. In this case, the action plan generator 140 outputs the target trajectory to the second controller 160. In response to this, the second controller 160 controls the acceleration/deceleration and steering of the host vehicle M based on the target trajectory. As a result, automated driving or driving support is executed.

On the other hand, when the current driving mode is mode A or B and the event count N exceeds the upper limit number $N_{MAX}$, the current driving mode is changed to the mode C, D, or E having a lower control level.

For example, when the mode is changed to mode C, the action plan generator 140 outputs the target trajectory to the second controller 160 as in the case where the mode C is maintained. In response to this, the second controller 160 controls the acceleration/deceleration and steering of the host vehicle M based on the target trajectory. As a result, driving support based on the target trajectory is executed under mode C.

When the mode is changed to mode D, the action plan generator 140 outputs the target trajectory to the second controller 160. In this case, the second controller 160 controls the travel drive force output device 200 and the brake device 210, or the steering device 220, which are the control targets, based on the target trajectory. That is, the second controller 160 controls either the acceleration/deceleration or steering of the host vehicle M.

When the mode is changed to mode E, the action plan generator 140 does not output the target trajectory to the second controller 160. In this case, the ECUs of the travel drive force output device 200, the brake device 210, and the steering device 220, which are the control targets of the second controller 160, control the corresponding devices in response to the driver's operation on the driving operator 80. That is, the acceleration/deceleration and steering of the host vehicle M are controlled by manual driving. In this way, the processing of this flowchart ends.

According to the first embodiment described above, the navigation device 50 determines the route from the position of the host vehicle M specified by the GNSS receiver 51 to the destination input by the occupant. The MPU 60 determines a recommended lane in which the host vehicle M should travel on the route to the destination determined by the navigation device 50. The automated driving control device 100 recognizes the surrounding situation of the host vehicle M, and determines events that define the traveling state of the host vehicle M based on the surrounding situation and the recommended lane determined by the MPU 60. The automated driving control device 100 generates a target trajectory corresponding to the determined event, and controls the acceleration/deceleration and steering of the host vehicle M based on the target trajectory. That is, the automated driving control device 100 performs automated driving (including driving support) based on the target trajectory. At this time, the automated driving control device 100 changes the control level of the automated driving according to the number of events. When the event count N exceeds the upper limit number $N_{MAX}$, it means that the control of automated driving becomes complex or difficult. Therefore, by considering the event count N as an index of the complexity and difficulty of control in automated driving and changing the control level of automated driving according to the event count N, more appropriate automated driving can be performed.

Second Embodiment

Hereinafter, a second embodiment will be described. The second embodiment is different from the first embodiment described above in that when the event count N exceeds the upper limit number $N_{MAX}$, a specific event is removed from the N events. Hereinafter, this difference from the first embodiment will be mainly described, and points shared by the first embodiment will be omitted. In the description of the second embodiment, parts which are the same as those of the first embodiment will be denoted with the same reference numerals.

Figure 14:
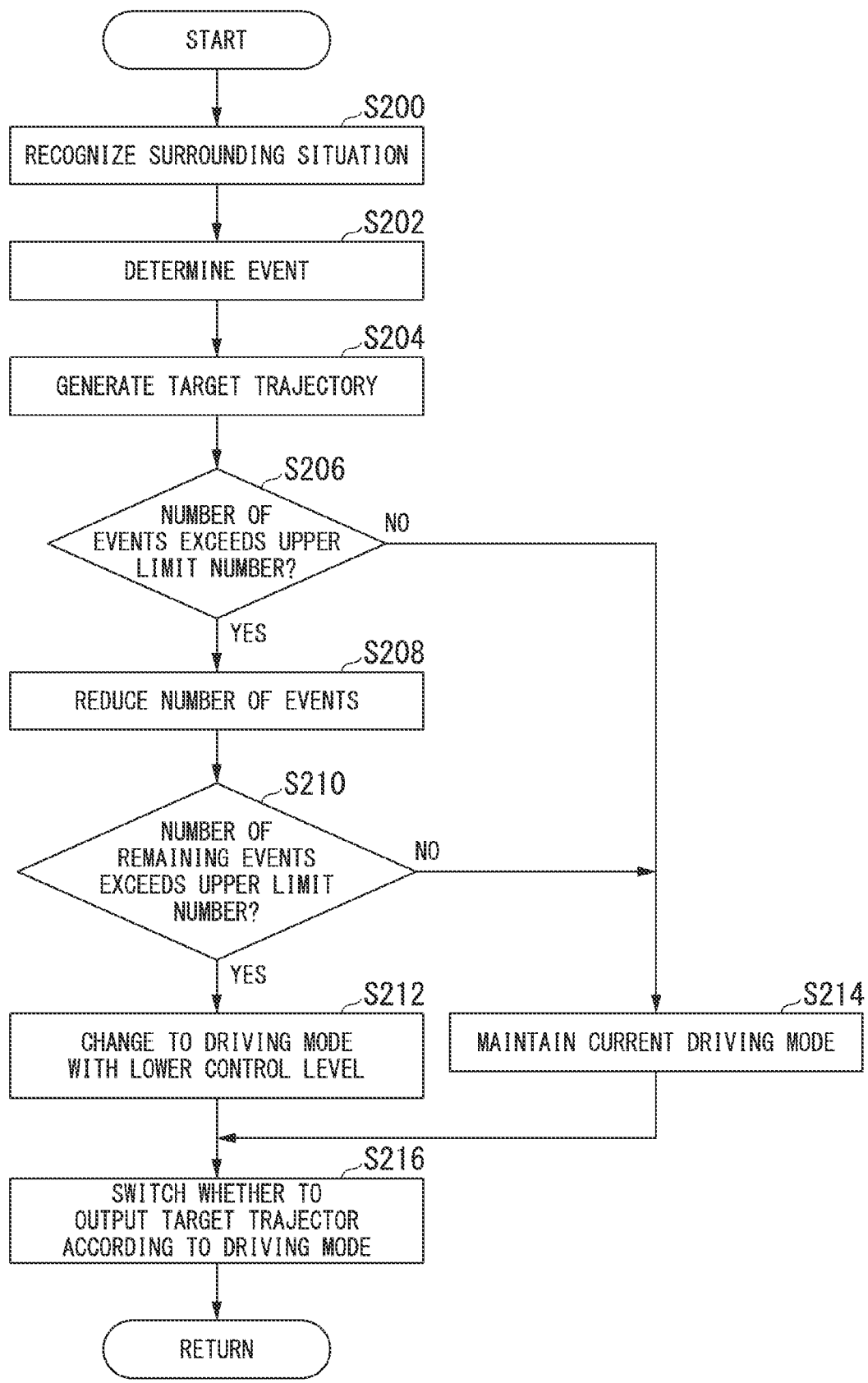
FIG. 14 is a flowchart illustrating an example of the flow of a series of processes by an automated driving control device according to a second embodiment.

FIG. 14 is a flowchart illustrating an example of the flow of a series of processes by the automated driving control device 100 according to the second embodiment. The processing of this flowchart may be repeatedly executed at a predetermined cycle, for example, when some execution conditions described in the first embodiment are satisfied.

First, the recognizer 130 recognizes the situation (or environment) around the host vehicle M (step S200).

Next, the action plan generator 140 determines an event for automated driving on the route to the destination where the recommended lane is determined by the MPU 60 (step S202).

Next, the action plan generator 140 generates a target trajectory for each event (step S204).

Next, the mode change processor 154 monitors the number of events (that is, the event count N) determined for a section within a predetermined distance Dth ahead of the current position of the host vehicle M among one or a plurality of events determined by the action plan generator 140 and determines whether the event count N exceeds the upper limit number $N_{MAX}$ (step S206).

Next, when the event count N exceeds the upper limit number $N_{MAX}$, the mode change processor 154 removes the events that are not indispensable for the host vehicle M to reach the destination from the N events (step S208).

As described above, the N events include various types of events including a constant speed travel event, a low-speed pilot travel event, a lane change event, a passing event, a branching event, a branching point passing event, a merging event, a merging point passing event, a lane reduction event, a takeover event, and a traffic light passing event. The plurality of events includes an event that is indispensable for the host vehicle M to reach the destination (hereinafter referred to as a mandatory event) and an event that is not indispensable for the host vehicle M to reach the destination (hereinafter, referred to as an optional event). The mandatory event is an example of a "first event", and the optional event is an example of a "second event".

For example, a branching event, a branching point passing event, a merging event, a merging point passing event, a lane reduction event, a takeover event, a traffic light passing event, and the like are mandatory events that are indispensable for the host vehicle M to reach the destination. On the other hand, a constant speed travel event, a low-speed pilot travel event, a lane change event, a passing event, and the like are optional events that are not indispensable for the host vehicle M to reach the destination.

Next, the mode change processor 154 determines whether the number of remaining mandatory events (hereinafter referred to as a reduced event count N') excluding optional events from the N events exceeds the upper limit number $N_{MAX}$ (step S210).

For example, it is assumed that many lane change events and passing events are determined in order to arrive at the destination as soon as possible, and as a result, the event count N exceeds the upper limit number $N_{MAX}$. In this case, by removing optional events such as a lane change event and a passing event from the N events, it can be expected that the reduced event count N' will become equal to or less than the upper limit number $N_{MAX}$. That is, it can be expected that the control in automated driving will be simplified or facilitated.

When the reduced event count N' exceeds the upper limit number $N_{MAX}$, the mode change processor 154 changes the driving mode of the host vehicle M to a driving mode having a lower control level (step S212).

On the other hand, when the event count N or the reduced event count N' is equal to or less than the upper limit number $N_{MAX}$, the mode change processor 154 maintains the current driving mode without changing the driving mode of the host vehicle M (step S214).

The action plan generator 140 switches between whether or not to output the target trajectory to the second controller 160 according to the driving mode changed or maintained by the mode change processor 154 (step S216). In this way, the processing of this flowchart ends.

According to the second embodiment described above, the automated driving control device 100 removes optional events from among N events that have exceeded the upper limit number $N_{MAX}$. As a result, the number of remaining mandatory events excluding optional events (that is, the reduced event count N') tends to be less than or equal to the upper limit number $N_{MAX}$. As a result, the control in the automated driving can be simplified or facilitated without lowering the control level. That is, the control level of automated driving can be changed more appropriately.

[Supplementary Notes]

The above-described embodiments may be expressed as follows.

Expression Example 1

A vehicle control device including: a memory that stores a program; and a hardware processor, wherein the hardware processor executes the program to execute: recognizing a situation around a vehicle; determining events that define a traveling state of the vehicle based on the recognized situation, a route to a destination of the vehicle, and a position of the vehicle; and performing automated driving that controls at least one of acceleration/deceleration and steering of the vehicle based on the determined events, wherein changing the control level of the automated driving according to the number of events within a predetermined range in a traveling direction of the vehicle.

Expression Example 2

A vehicle control device including: a memory that stores a program; and a hardware processor, wherein the hardware processor executes the program to execute: recognizing a situation around a vehicle; determining events that define a traveling state of the vehicle based on the recognized situation, a route to a destination of the vehicle, and a position of the vehicle; determining any one of a plurality of driving modes including a first driving mode (for example, mode C, mode D, or mode E) and a second driving mode (for example, mode A or mode B) in which a driver is assigned a milder task than in the first driving mode as a driving mode of the vehicle; performing automated driving that controls at least one of acceleration/deceleration and steering of the vehicle according to the determined events; changing the driving mode of the vehicle to a driving mode in which the driver is assigned a heavier task when the task in the determined driving mode is not executed by the driver; and when the number of events within a predetermined range in a traveling direction of the vehicle exceeds an upper limit number, changing the driving mode of the vehicle to a driving mode in which the driver is assigned a heavier task as compared with the number of events is equal to or less than the upper limit number.

While aspects for carrying out the present invention have been described using embodiments, the present invention is not limited to these embodiments, and various changes and substitutions can be made without departing from the spirit of the present invention.

What is claimed is:

1. A vehicle control device comprising:
a processor configured to execute instructions to:
recognize a situation around a vehicle;
determine events that define a traveling state of the vehicle based on i) the recognized situation, ii) a route to a destination of the vehicle, and iii) a position of the vehicle;
perform automated driving that controls at least one of acceleration, deceleration and steering of the vehicle based on the determined events;
determine whether a number of events within a predetermined range in a traveling direction of the vehicle among the determined events exceeds an upper limit number, wherein the events within the predetermined range include first events that are indispensable for the vehicle to reach the destination and second events that are not indispensable for the vehicle to reach the destination;
remove the second events from the events within the predetermined range when the number of the events within the predetermined range exceeds the upper limit number; and
lower a current control level of the automated driving when a number of the first events remaining from the events within the predetermined range after removing the second events exceeds the upper limit number.

2. A vehicle control method, comprising:
recognizing, by a computer mounted on a vehicle, a situation around the vehicle;
determining, by the computer, events that define a traveling state of the vehicle based on i) the recognized situation, ii) a route to a destination of the vehicle, and iii) a position of the vehicle;
performing, by the computer, automated driving that controls at least one of acceleration, deceleration, and steering of the vehicle based on the determined events;
determining, by the computer, whether a number of events within a predetermined range in a traveling direction of the vehicle among the determined events exceeds an upper limit number, wherein the events within the predetermined range include first events that are indispensable for the vehicle to reach the destination and second events that are not indispensable for the vehicle to reach the destination;
removing, by the computer, the second events from the events within the predetermined range when the number of the events within the predetermined range exceeds the upper limit number; and
lowering, by the computer, a current control level of the automated driving when a number of the first events remaining from the events within the predetermined range after removing the second events exceeds the upper limit number.

3. A computer-readable non-transitory storage medium storing a program for causing a computer mounted on a vehicle to execute operations comprising:
recognizing a situation around the vehicle;
determining events that define a traveling state of the vehicle based on i) the recognized situation, ii) a route to a destination of the vehicle, and iii) a position of the vehicle;
performing automated driving that controls at least one of acceleration, deceleration, and steering of the vehicle based on the determined events;
determining whether a number of events within a predetermined range in a traveling direction of the vehicle among the determined events exceeds an upper limit number, wherein the events within the predetermined range include first events that are indispensable for the vehicle to reach the destination and second events that are not indispensable for the vehicle to reach the destination;
removing the second events from the events within the predetermined range when the number of the events within the predetermined range exceeds the upper limit number; and
lowering a current control level of the automated driving when a number of the first events remaining from the events within the predetermined range after removing the second events exceeds the upper limit number.

* * * * *